Dec. 4, 1956  D. F. MARCKS  2,773,233
EXCITATION SYSTEMS
Filed April 20, 1954  2 Sheets-Sheet 1

WITNESSES:  INVENTOR
Donald F. Marcks.
BY
ATTORNEY

Dec. 4, 1956 D. F. MARCKS 2,773,233
EXCITATION SYSTEMS
Filed April 20, 1954 2 Sheets-Sheet 2

United States Patent Office 2,773,233
Patented Dec. 4, 1956

2,773,233

EXCITATION SYSTEMS

Donald F. Marcks, Joliet, Ill., assignor to Westinghouse Electric Corporation, East Pittsburgh, Pa., a corporation of Pennsylvania Application April 20, 1954, Serial No. 424,374

9 Claims. (Cl. 322—25)

This invention relates to excitation systems and, in particular, to excitation systems for use with alternating-current generators.

A customary means for obtaining the main excitation for an alternating-current generator when it is under load, and for securing high speed regulation for the generator when the power factor is not very low and leading, is to render current transformers responsive to the output current of the generator and then rectify the output from the current transformers and supply the resulting direct-current energy to the field winding of the generator. When utilizing such an excitation system the saturation curves of the current transformers must be such as to produce the normal generator excitation in a linear fashion up through all load requirements which may be as high as 150%.

When a fault occurs on a load circuit which is supplied by an alternating-current generator it is desirable to isolate only the point of fault without interrupting the energy supplied to other loads associated therewith which are functioning properly. This is accomplished by a plurality of circuit interrupters which operate on the principle of selective tripping. That is, the circuit interrupter of the highest rating is set for the longest time delay. In practice, the short circuit current produced when a fault occurs in one of the load circuits must be sufficiently large to provide the selective tripping of the circuit interrupters.

Thus, in order to secure proper operation of the above described excitation system it is necessary to design the current transformers so that their characteristics are such as to provide the normal generator excitation in a linear fashion up through all load requirements and also provide sufficient generator excitation under short circuit conditions as to enable selective tripping of circuit interrupters in the load circuits. However, when the current transformers are designed to meet these requirements it has been found that excessive generator excitation is produced under short circuit conditions. This excessive generator excitation if permitted to remain over a period of time will effect an unnecessary opening of the main load circuit interrupter or it may actually cause damage to the circuit interrupters in the load circuits. Therefore, some means should be provided in order to prevent this excessive generator excitation.

An object of this invention is to provide a generator excitation system which produces the normal generator excitation in a linear manner up through all load requirements and yet prevents excessive generator excitation under short circuit conditions.

Another object of this invention is to provide a generator excitation system which under short circuit conditions produces a short circuit current of sufficient magnitude to provide the desired selective tripping of circuit interrupters to thus isolate only the point of fault, and yet prevents excessive generator excitation under short circuit conditions.

A further object of this invention is to provide a generator excitation system for parallel connected generators which produces the desired droop compensation in order to balance the division of reactive load between the parallel connected generators, and yet prevents excessive droop compensation.

Other objects of this invention will become apparent from the following description when taken in conjunction with the accompanying drawings in which.

Figure 1:
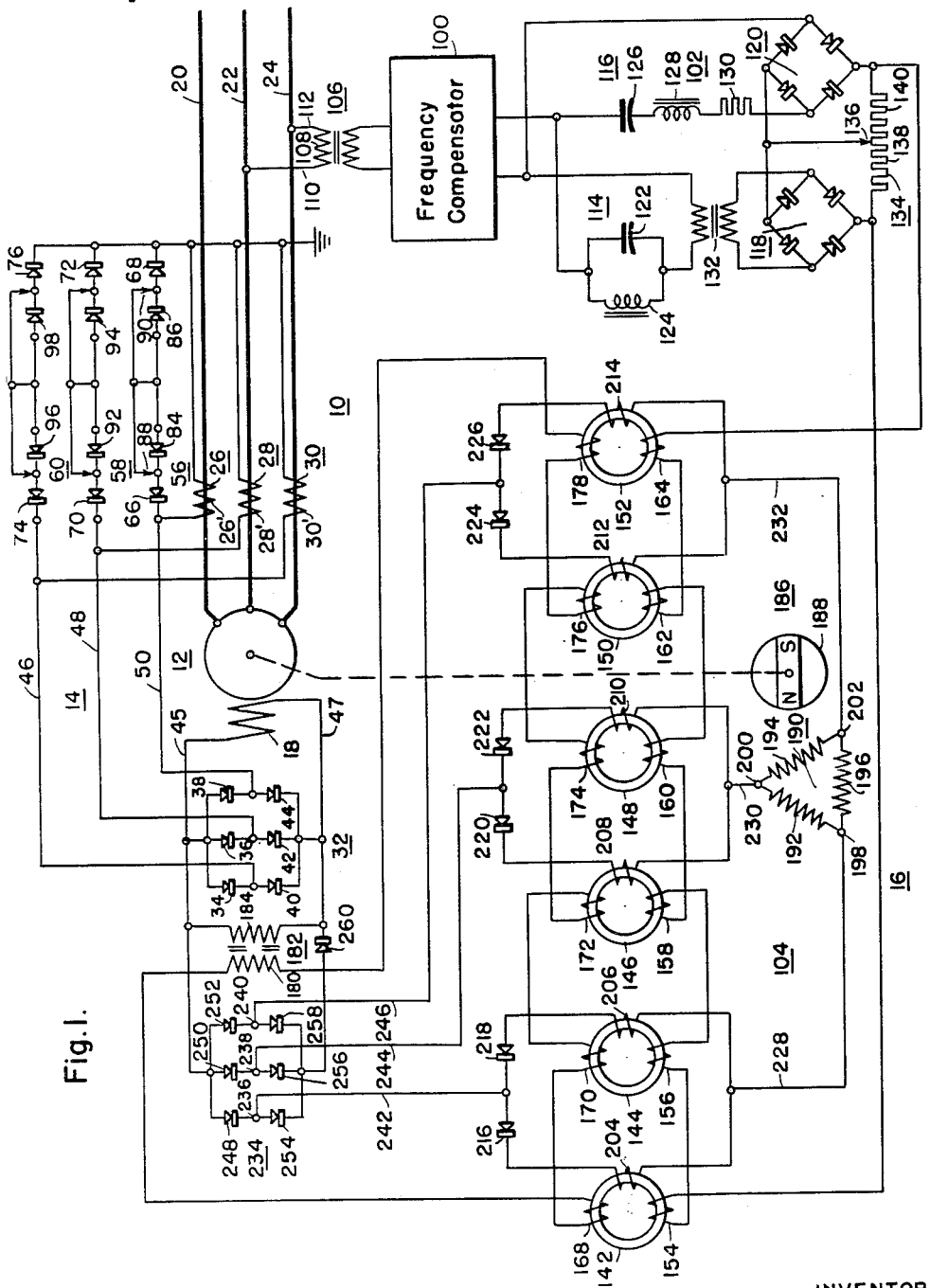
Figure 1 is a schematic diagram of circuits and apparatus illustrating an embodiment of the teachings of this invention.

Referring to Fig. 1 of the drawing, there is illustrated generally at 10 an excitation system for maintaining the output voltage of a three-phase alternating-current generator 12 substantially constant. The excitation system 10 comprises, in general, a main excitation system 14 and a regulator system 16. In operation, under normal load conditions the main excitation system 14 provides the main excitation for the dynamo-electric machine or generator 12, and provides fast response regulation for the generator 12 when the power factor is not very low and leading. The remaining excitation under normal load conditions is supplied by the regulator system 16. However, under three-phase short circuit conditions the main excitation system 14 supplies all of the needed generator excitation. On the other hand, under no load conditions the regulator system 16 provides the necessary generator excitation.

In the embodiment of Fig. 1, the generator 12 comprises a field winding 18. As illustrated, the generator 12 is disposed to supply alternating-current energy to load conductors 20, 22 and 24. In order to obtain a measure of the output current of the generator 12, and thus a measure of the load current, current transformers 26, 28 and 30 are disposed in inductive relationship with the load conductors 20, 22 and 24, respectively. As illustrated, the load conductors 20, 22 and 24 constitute the primary windings for the current transformers 26, 28 and 30, respectively, and windings 26', 28' and 30' comprise the secondary windings for the current transformers 26, 28 and 30, respectively. However, it is to be understood that separate primary windings (not shown) could be provided for the current transformers 26, 28 and 30. These primary windings (not shown) would be connected in series circuit relationship with the load conductors 20, 22 and 24.

In order to rectify the alternating-current output of the current transformers 26, 28 and 30 a three-phase dry-type rectifier 32 is provided. In this instance, the rectifier 32 comprises six legs 34, 36, 38, 40, 42 and 44. As illustrated, the input terminals of the rectifier 32 are interconnected with the secondary windings 26', 28' and 30' of the current transformers 26, 28 and 30, respectively, by means of conductors 46, 48 and 50. On the other hand, the output terminals of the rectifier 32 are connected to the field winding 18 of the generator 12 by means of conductors 45 and 47, to thereby render the field winding 18 responsive to the voltages across the secondary windings 26', 28' and 30'.

Figure 5:
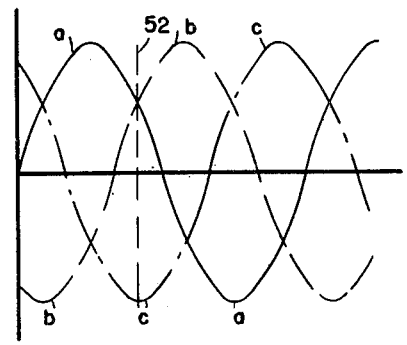
Fig. 5 illustrates the manner in which the voltages across the three associated current transformers, illustrated in Figures 1 through 3, vary with respect to one another.

The manner in which the rectifier 32 rectifies the alternating-current output of the current transformers 26, 28 and 30 can be better understood by referring to Fig. 5. In Fig. 5, the voltages across the secondary windings 26', 28' and 30', are represented by the curves a, b and c, respectively. Assuming the magnitudes and polarities of the voltages across the secondary windings 26', 28' and 30', for a given instant of operation, are as illustrated along the line 52, then the left end of the secondary winding 26', as illustrated, is at a positive polarity with respect to its right end, when the left end of the secondary winding 28', as illustrated, is at a positive polarity with respect to its right end, and the right end of the secondary winding 30', as illustrated, is at a positive polarity with respect to its left end. Under such assumed conditions, current flows from the left end of the secondary winding 26', as illustrated, through the conductor 50, the leg 44 of the rectifier 32, the field winding 18 of the generator 12, the leg 34 of the rectifier 32, the conductor 46, and the secondary winding 30', to the right end of the secondary winding 26'. At the same time, current also flows from the left end of the secondary winding 28', as illustrated, through the conductor 48, the leg 42 of the rectifier 32, the field winding 18 of the generator 12, the leg 34 of the rectifier 32, the conductor 46, and the secondary winding 30', to the right end of the secondary winding 28'. Under the same assumed conditions, current also flows from the right end of the secondary winding 30, as illustrated, through the secondary winding 28, the conductor 48, the leg 42 of the rectifier 32, the field winding 18 of the generator 12, the leg 34 of the rectifier 32, and the conductor 46, to the left end of the secondary winding 30'. At the same time, current also flows from the right end of the secondary winding 30, as illustrated, through the secondary winding 26', the conductor 50, the leg 44 of the rectifier 32, the field winding 18 of the generator 12, the leg 34 of the rectifier 32, and the conductor 46, to the left end of the secondary winding 30'.

In accordance with the teachings of this invention in order to prevent excessive excitation of the generator 12 under three-phase short circuit conditions on the load conductors 20, 22 and 24, shunt circuits 56, 58 and 60, having specific characteristics, are connected to the secondary windings 26', 28' and 30', respectively, and in shunt circuit relationship with respect to the field winding 18 of the generator 12. The characteristic of each of these shunt circuits 56, 58 and 60 is that in operation they offer a high impedance until a predetermined voltage is developed across their respective associated secondary windings 26', 28' and 30', and then once the predetermined voltage is developed across the respective secondary windings 26', 28' and 30' the impedance of the respective shunt circuits 56, 58 and 60 decreases so that if a large increase in current were to flow through the respective shunt circuits 56, 58 and 60 as a result of a tendency of the voltages across the shunt circuits 56, 58 and 60 to increase to a value above the predetermined voltage only a slight increase in voltage could appear across each of the shunt circuits. The tendency of the voltages across the shunt circuits 56, 58 and 60 to increase in magnitude is stopped when the total secondary current of the current transformers 26, 28 and 30 meets the primary to secondary ampere-turn ratio of the current transformers 26, 28 and 30.

Figure 4:
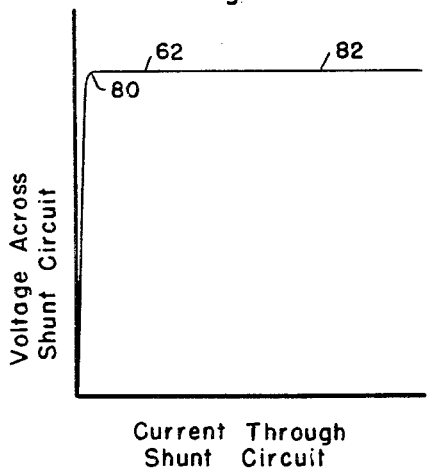
Fig. 4 is a graph, the curve of which illustrates the manner in which the current through the shunt circuits, illustrated in Figs. 1, 2 and 3, varies with changes in the magnitude of the voltage impressed thereacross.

Referring to Fig. 4, a curve 62 represents the manner in which the voltage varies across the secondary windings 26', 28' and 30' and thus across the shunt circuits 56, 58 and 60. As can be seen from the curve 62, once a predetermined voltage is reached, the voltage across the particular shunt circuit does not substantially increase even though the current flow therethrough does increase.

In the embodiment of Fig. 1 the desired characteristic for the shunt circuits 56, 58 and 60 is obtained by means of crystal diodes. Specifically, the shunt circuit 56 includes two crystal diodes 66 and 68 which are connected back-to-back and in series circuit relationship with one another. In like manner, in the shunt circuit 58 the desired characteristic is obtained by connecting two crystal diodes 70 and 72 back-to-back and in series circuit relationship with one another. Also, in the shunt circuit 60 two crystal diodes 74 and 76 are connected back-to-back and in series circuit relationship with one another. The reason the various crystal diodes 66 and 68, 70 and 72, and 74 and 76, are connected back-to-back is to prevent the flow of current through the shunt circuits 56, 58 and 60 until a predetermined voltage is reached across their respective associated secondary windings 26', 28' and 30' irrespective of the polarity of the voltages across the secondary windings. In practice, the crystal diodes hereinbefore mentioned can be, for instance, silicon or germanium diodes.

In operation, when a predetermined back-voltage is produced across the crystal diode 66, the crystal diode 66 conducts current in the reverse direction. In like manner, when a predetermined back-voltage is produced across the crystal diode 68, the crystal diode 68 conducts current in the reverse direction. Thus, the crystal diodes 66 and 68 are voltage responsive impedance members whose impedance is a function of the magnitude of the voltage across each of the crystal diodes 66 and 68. When the voltage across the secondary winding 26' reaches a predetermined value, and the left end of the secondary winding 26', as illustrated, is at a positive polarity with respect to its right end, current flows from the left end of the secondary winding 26' through the crystal diode 66, in the reverse direction, and the crystal diode 68, in the forward direction, to the right end of the secondary winding 26'. It is to be noted that only the excess current flows through the shunt circuit 56 when the crystal diode 66 breaks down. This can be better seen by referring to the curve 62 of Fig. 4. For instance, the crystal diode 66 breaks down and conducts current in the reverse direction when the voltage across the shunt circuit 56 reaches the value illustrated at 80. Since only the excess current flows through the shunt circuit 56 this enables the voltage across the secondary winding 26' to provide the sustained generator excitation. This is illustrated by the substantially horizontal portion 82 of the curve 62.

On the other hand, when a predetermined back-voltage is developed across the crystal diode 68, the crystal diode 68 conducts current in the reverse direction. In particular, current flows from the right end of the secondary winding 26', as illustrated, through the crystal diode 68, in the reverse direction, and the crystal diode 66, in the forward direction, to the left end of the secondary winding 26'. Here again, only the excess current flows through the crystal diodes 68 and 66 are illustrated by the curve 62 of Fig. 4. Since the crystal diodes 70 and 72 of the shunt circuit 58 and the crystal diodes 74 and 76 of the shunt circuit 60 function in the same manner with respect to their associated secondary windings 28' and 30', respectively, a further description of their operation is deemed unnecessary. Thus, the crystal diodes 70, 72, 74, and 76 are voltage impedance members whose impedance is a function of the magnitude of the voltage across each of the crystal diodes 70, 72, 74, and 76.

In practice, it may become necessary to include more than two crystal diodes in each of the shunt circuits 56, 58, and 60. For instance, if the crystal diodes 66 and 68 break down in the reverse direction at too low a value of back-voltage for the particular application, it may become necessary to include crystal diodes 84 and 86 in the shunt circuit disposed across the secondary winding 26'. This is accomplished by actuating movable contact members 88 and 90 towards one another until the shunt disposed across the crystal diodes 84 and 86 is removed. Then the shunt circuit disposed across the secondary winding 26' will include a series circuit comprising the crystal diodes 66, 84, 86 and 68. When these four crystal diodes 66, 84, 86 and 68 are included in the shunt circuit connected to the secondary winding 26', the voltage across the secondary winding 26' can increase to a larger value before effecting a conduction of current in the reverse direction through the crystal diodes. Of course, when the crystal diodes 84 and 86 are also included in the shunt circuit connected to the secondary winding 26', a corresponding change should be made in the shunt circuits connected to the secondary windings 28' and 30', respectively. That is, crystal diodes 92 and 94 should be included in the shunt circuit connected to the secondary winding 28', and crystal diodes 96 and 98 should be included in the shunt circuit connected to the secondary winding 30'.

Thus, from the foregoing it can be realized that the current transformers 26, 28 and 30 can be designed to provide the normal generator excitation in a linear fashion up through all load requirements and to provide a short circuit current of sufficient magnitude to obtain the desired selective tripping of circuit interrupters (not shown) to thus isolate only the point of fault, and yet the shunt circuits 56, 58 and 60 prevent excessive generator excitation under three-phase short circuit conditions on the load conductors 20, 22 and 24.

The regulator system 16 will now be described. In general, the regulator system 16 comprises a suitable frequency compensating network 100 which provides a measure of the output voltage of the generator 12 which is substantially independent of the frequency of the output voltage, a voltage reference network 102 which provides at its output a voltage measure of the deviation of the output voltage of the generator 12 from the regulated value, and a three-phase magnetic amplifier 104 which is responsive to the output of the voltage reference network 102 and is disposed to control the excitation of the generator 12.

In particular, the frequency compensating network 100 is responsive to the voltage across the load conductors 22 and 24. More specifically, a potential transformer 106, having a primary winding 108, is interconnected between the frequency compensating network 100 and the load conductors 22 and 24. As illustrated, conductors 110 and 112 connect the primary winding 108, of the transformer 106, to the load conductors 22 and 24.

The voltage reference network 102, in this instance, comprises two non-linear impedance devices 114 and 116 disposed to supply energy to full-wave dry-type rectifiers 118 and 120, respectively. The non-linear impedance device 114 comprises a capacitor 122 and a saturating reactor 124 connected in parallel circuit relationship with one another, whereas the non-linear impedance device 116 comprises a capacitor 126, a saturating reactor 128, and a resistor 130 connected in series circuit relationship with one another. As illustrated, an isolating transformer 132 is electrically connected between the output of the non-linear impedance device 114 and the input to the rectifier 118 in order to isolate the components of the non-linear impedance devices 114 and 116 from the direct-current output of the rectifiers 118 and 120.

In order to provide for obtaining an output voltage from the voltage reference network 102, which is in accordance with the deviation of the voltage across the load conductors 22 and 24 from the predetermined value which is to be maintained substantially constant, the output terminals of the rectifiers 118 and 120 are connected in circuit relationship with a resistor 134, different portions or sections of which are disposed to be connected in circuit relationship with the respective rectifiers, as by means of a sliding contact member 136. Thus in operation, a portion 138 of the resistor 134, connected between the sliding contact member 136 and one of the output terminals of the rectifier 118, provides a potential which is a measure of the output voltage of the rectifier 118. On the other hand, a portion 140 of the resistor 134, connected between the sliding contact member 136 and one of the output terminals of the rectifier 120, provides a potential which is a measure of the output voltage of the rectifier 120. Thus in practice, the potentials across the portions 138 and 140 of the resistor 134 oppose one another.

In operation, the magnetic amplifier 104 is responsive to the output voltage of the voltage reference network 102, specifically it is responsive to the voltage across the resistor 134. As illustrated, the magnetic amplifier 104 comprises a plurality of magnetic core members 142, 144, 146, 148, 150 and 152. In order to vary the magnetic saturation of the core members 142, 144, 146, 148, 150 and 152 in accordance with the magnitude of the voltage across the resistor 134 of the voltage reference network 102 a plurality of control windings 154, 156, 158, 160, 162 and 164 are disposed in inductive relationship with the core members 142, 144, 146, 148, 150 and 152, respectively. As illustrated, the control windings 154, 156, 158, 160, 162 and 164 are connected in series circuit relationship with one another, the series circuit being connected across the resistor 134 of the voltage reference network 102.

In addition to the above-referred to windings, a plurality of damping windings 168, 170, 172, 174, 176, and 178 are likewise disposed in inductive relationship with the core members 142, 144, 146, 148, 150 and 152, respectively, in order to produce a flux which opposes the action of the respective control windings 154, 156, 158, 160, 162 and 164 and thus prevents hunting in the system. The damping windings 168, 170, 172, 174, 176 and 178 are connected in series circuit relationship with one another, the series circuit being connected across the secondary winding 180 of a damping transformer 182 whose primary winding 184 is electrically connected across the field winding 18 of the generator 12.

In order to supply high frequency energy to the magnetic amplifier 104 and thus increase its speed of response as well as the speed of response of the regulator system 16, a permanent magnetic pilot exciter 186 is provided. As illustrated, the permanent magnetic pilot exciter 186 comprises a rotor 188 and a three-phase stator 190 having three windings 192, 194 and 196, the junction point of the windings 192 and 196 being connected to a terminal 198, the junction point of the windings 192 and 194 being connected to a terminal 200, and the junction point of the windings 194 and 196 being connected to a terminal 202.

As illustrated, load windings 204, 206, 208, 210, 212 and 214 are disposed in inductive relationship with the core members 142, 144, 146, 148, 150 and 152, respectively. In this instance, the load windings 204 and 206 are connected in parallel circuit relationship with one another, the load winding 204 being connected in series circuit relationship with a self-saturating rectifier 216 and the load winding 206 being connected in series circuit relationship with the self-saturating rectifier 218 in order to produce self-saturation for the core members 142 and 144, respectively. The load windings 208 and 210 are likewise connected in parallel circuit relationship with one another, the load winding 208 being connected in series circuit relationship with a self-saturating rectifier 220 and the load winding 210 being connected in series circuit relationship with a self-saturating rectifier 222 in order to produce self-saturation for the core members 146 and 148, respectively. In like manner, the load windings 212 and 214 are connected in parallel circuit relationship with one another, the load winding 212 being connected in series circuit relationship with a self-saturating rectifier 224 and the load winding 214 being connected in series circuit relationship with a self-saturating rectifier 226 in order to produce self-saturation for the core members 150 and 152, respectively.

In order to supply high frequency energy to the load windings 204, 206, 208, 210, 212 and 214, the terminals 198, 200 and 202 are connected to the junction point of the load windings 204 and 206, the junction point of the load windings 208 and 210, and the junction point of the load windings 212 and 214, respectively, by means of conductors 228, 230 and 232, respectively.

On the other hand, in order to supply energy from the output of the magnetic amplifier 104 to a three-phase dry-type rectifier 234 having input terminals 236, 238 and 240, a conductor 242 is connected to the junction point of the self-saturating rectifiers 216 and 218 of the magnetic amplifier 104 and to the input terminal 236 of the rectifier 234. In like manner, a conductor 244 is electrically connected to the junction point of the self-saturating rectifiers 220 and 222 of the magnetic amplifier 104 and to the input terminal 238 of the rectifier 234. Another conductor 246 is electrically connected to the junction point of the self-saturating rectifiers 224 and 226 and to the input terminal 240 of the rectifier 234. In this instance, the three-phase rectifier 234 comprises a plurality of legs 248, 250, 252, 254, 256 and 258. As illustrated, a rectifier 260 is connected in circuit relationship with the rectifier 234 and with one side of the field winding 18 of the generator 12 in order to decrease the magnitude of the voltage that appears across the three-phase rectifier 234 and thus permits the use of a smaller rectifier 234.

For the purpose of more clearly understanding the sequence of flow of current through the load windings 204, 206, 208, 210, 212 and 214, let us assume that energy is being furnished by the phase as represented by the winding 192 of the pilot exciter 186. When this condition exists, current will flow from the terminal 198 of the stator 190 through the conductor 228, the load winding 206 of the magnetic amplifier 104, the self-saturating rectifier 218, the conductor 242, the input terminal 236 of the rectifier 234, the leg 254 of the rectifier 234, the rectifier 260, the field winding 18 of the generator 12, the leg 250 of the rectifier 234, the conductor 244, the self-saturating rectifier 220 of the magnetic amplifier 104, the load winding 208, and the conductor 230, to the terminal 200 of the pilot exciter 186. Moving to the next phase, current will flow from the terminal 200 of the pilot exciter 186 through the conductor 230, the load winding 210 of the magnetic amplifier 104, the self-saturating rectifier 222, the conductor 244, the input terminal 238 of the rectifier 234, the leg 256 of the rectifier 234, the rectifier 260, the field winding 18 of the generator 12, the leg 252 of the rectifier 234, the conductor 246, the self-saturating rectifier 224 of the magnetic amplifier 104, the load winding 212, and the conductor 232, to the terminal 202 of the pilot exciter 186. Finally in the third phase, current will flow from the terminal 202 through the conductor 232, the load winding 214 of the magnetic amplifier 104, the self-saturating rectifier 226, the conductor 246, the input terminal 240 of the rectifier 234, the leg 258 of the rectifier 234, the rectifier 260, the field winding 18 of the generator 12, the leg 248 of the rectifier 234, the conductor 242, the self-saturating rectifier 216 of the magnetic amplifier 104, the load winding 204, and the conductor 228, to the terminal 198 of the pilot exciter 186.

The operation of the regulator system 16 will now be described. When the output voltage of the generator 12 is at the regulated value the output voltage of the rectifier 120 is of greater value than the output voltage of the rectifier 118 of the voltage reference network 102. Therefore, the right end of the resistor 134, as shown, is at a positive polarity with respect to the left end of the resistor 134. Thus, under such assumed conditions, current flows from the right end of the resistor 134, as shown, through the control windings 164, 162, 160, 158, 156 and 154 of the magnetic amplifier 104, to the left end of the resistor 134 of the voltage reference network 102. Under such conditions, the current flow through the control windings 164, 162, 160, 158, 156 and 154 produces a flux in the respective core members that opposes the flux produced in these core members by the current flow through the associated load windings 214, 212, 210, 208, 206 and 204, respectively.

Assuming the output voltage of the generator 12 increases to a value greater than its regulated value, then the current flow through the control windings 164, 162, 160, 158, 156 and 154 of the magnetic amplifier 104 increases to thereby decrease the magnetic saturation of the core members 152, 150, 148, 146, 144 and 142, respectively. The decreased magnetic saturation of the core members 152, 150, 148, 146, 144 and 142 increases the impedance of the load windings 214, 212, 210, 208, 206, and 204, respectively, to thus decrease the current flow therethrough and the current flow to the input terminals 236, 238 and 240 of the three-phase rectifier 234. Since the field winding 18 of the generator 12 is electrically connected to the output terminals of the rectifier 234, the voltage across the field winding 18 decreases to thereby return the output voltage of the generator 12 to its regulated value.

On the other hand, assuming the output voltage of the generator 12 decreases to a value less than its regulated value, then the current flow through the control windings 164, 162, 160, 158, 156 and 154 decreases, to thereby increase the magnetic saturation of the core members 152, 150, 148, 146, 144 and 142, respectively. An increase in the magnetic saturation of the core members 152, 150, 148, 146, 144 and 142 decreases the impedance of the load windings 214, 212, 210, 208, 206 and 204, respectively, thus increasing the current flow therethrough and the current flow to the input terminals 236, 238 and 240 of the rectifier 234. Such an action effects a decrease in the voltage across the field winding 18 of the generator 12 to thereby return the output voltage of the generator 12 to its regulated value.

Figure 2:
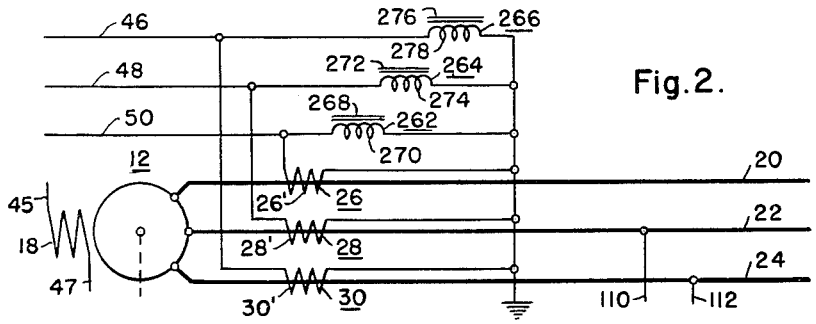
Fig. 2 is a schematic diagram of another embodiment of this invention in which saturating reactors have been substituted for the crystal diodes shown in Fig. 1.

Referring to Fig. 2 there is illustrated another embodiment of this invention in which like components of Figs. 1 and 2 have been given the same reference characters. The main distinction between the apparatus of Figs. 1 and 2 is that in the apparatus of Fig. 2 saturating reactors 262, 264 and 266 have been substituted for the crystal diodes illustrated in Fig. 1.

The saturating reactor 262 comprises magnetic core means 268 and a reactor winding 270 disposed in inductive relationship with the magnetic core means 268 and connected to the secondary winding 26' of the current transformer 26 and in shunt circuit relationship with the field winding 18 of the generator 12. In like manner, the saturating reactor 264 comprises magnetic core means 272 and a reactor winding 274 disposed in inductive relationship with the magnetic core means 272 and connected to the secondary winding 28' and in shunt circuit relationship with the field winding 18 of the generator 12. Further, the saturating reactor 266 comprises magnetic core means 276 and a reactor winding 278 disposed in inductive relationship with the magnetic core means 276 and connected to the secondary winding 30' and in shunt circuit relationship with the field winding 18 of the generator 12.

The voltage-current characteristic curves for the saturating reactors 262, 264 and 266 is similar to the curve 62 as shown in Fig. 4.

For instance, the voltage-current characteristic curves for the saturating reactors 262, 264 and 266 likewise have a sharp knee as shown at the point 80 of curve 62.

In operation, once the voltage across the reactor windings 270, 274 and 278 reaches a predetermined value the associated magnetic core means 268, 272 and 276 substantially completely saturate, thereby decreasing the impedance of the respective reactor windings. Thus, the saturating reactors 262, 264, and 266 are voltage responsive impedance members whose impedance is a function of the magnitude of the voltage across each of the saturating reactors 262, 264, and 266. Once the magnetic core means 268, 272 and 276 substantially completely saturate only the excess current flows through the shunt circuits including the reactor windings 270, 274 and 278. Thus the voltage across the secondary windings 26', 28' and 30' provide the sustained generator excitation. Since the remaining operation of the apparatus illustrated in Fig. 2 is similar to the operation of the apparatus illustrated in Fig. 1 a further description of such operation is deemed unnecessary.

Figure 3:
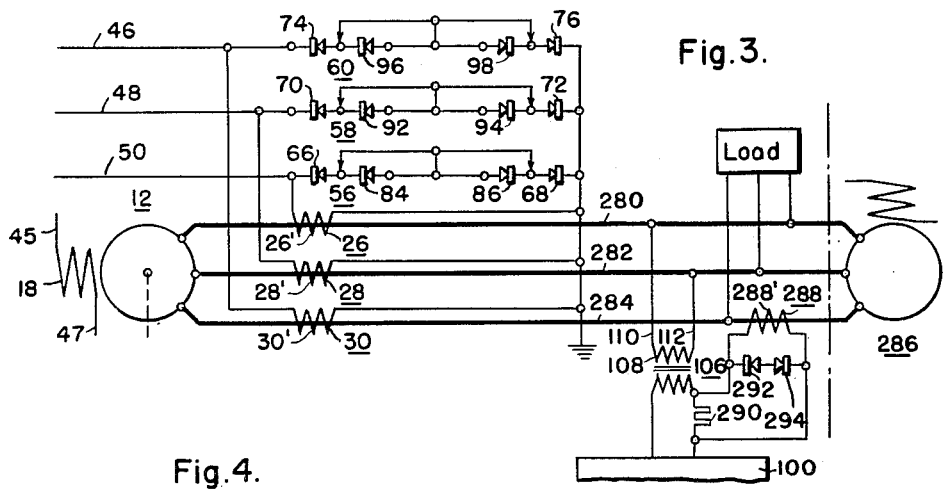
Fig. 3 illustrates the application of this invention to prevent excessive droop compensation for parallel connected generators.

Referring to Fig. 3 there is illustrated still another embodiment of this invention in which like components of Figs. 1 and 3 have been given the same reference characters. The main distinction between the apparatus of Figs. 1 and 3 is that in the apparatus of Fig. 3 the generator 12 is connected, by means of conductors 280, 282 and 284, to be operated in parallel with another three-phase alternating-current generator 286, and is provided with additional apparatus to prevent excessive droop compensation of the generator 12 during a single phase short.

As is well known in the art, droop compensation is provided for parallel connected generators in order to balance the division of reactive load between the parallel connected generators. One known way of obtaining droop compensation for the generator 12 is to inductively associate a current transformer 288, having a secondary winding 288', with the conductor 284. The secondary winding 288' is connected to a resistor 290 which is so interconnected with the transformer 106 and with the frequency compensating network 100 as to decrease the output voltage of the generator 12 with an increase in lagging reactive current circulated between the generators 12 and 286. However, it is undesirable to provide excessive droop compensation for the generator 12.

In order to prevent excessive droop compensation of the generator 12, crystal diodes 292 and 294 are connected back-to-back and in series circuit relationship with one another, the series circuit being connected to the secondary winding 288' and in shunt circuit relationship with the resistor 290. The crystal diodes 292 and 294, which for instance may be germanium or silicon diodes, function to limit the magnitude of the voltage across the secondary winding 288' once a predetermined voltage is developed across the secondary winding 288' in the same way as the crystal diodes 66 and 68 limit the voltage across the secondary winding 26' once a predetermined voltage is developed thereacross. Therefore, a further description of the apparatus of Fig. 3 is deemed unnecessary.

It is to be understood that a main exciter can be interconnected, as is well known in the art, between the damping transformer 182 and the three-phase rectifier 32. It is also to be understood that a saturating reactor (not shown) could be substituted for the crystal diodes 292 and 294 of Fig. 3.

The apparatus embodying the teachings of this invention has several advantages. For instance, when employing the apparatus of this invention the design of the current transformers 26, 28, 30, and 288 is not critical. In addition, the apparatus comprises static components of small size and weight. Further, as hereinbefore explained a very sharp limit point is produced by either the crystal diodes hereinbefore described or the saturating reactors 262, 264 and 266.

Since certain changes may be made in the above apparatus and circuits and different embodiments of the invention could be made without departing from the scope thereof, it is intended that all matter contained in the above description or shown in the accompanying drawings shall be interpreted as illustrative and not in a limiting sense.

I claim as my invention:

1. In an excitation system for a dynamo-electric machine having a field winding, the combination comprising, means for obtaining a measure of the output current of the dynamo-electric machine, the field winding of the dynamo-electric machine being responsive to the output of said means, and a shunt circuit connected in shunt circuit relationship with the field winding of the dynamo-electric machine, the shunt circuit also being responsive to the output of the said means and including a voltage responsive impedance member whose impedance is a function of the magnitude of the voltage across the voltage responsive impedance member, to thus prevent excessive excitation of the dynamo-electric machine under short circuit conditions.

2. In an excitation system for a generator having a field winding, the combination comprising, a current transformer responsive to the output current of the generator, the field winding of the generator being responsive to the output of the current transformer, and a shunt circuit connected in shunt circuit relationship with the field winding of the generator, the shunt circuit also being responsive to the output of the current transformer and including a voltage responsive impedance member whose impedance is a function of the magnitude of the voltage across the voltage responsive impedance member, to thus prevent excessive excitation of the generator under short circuit conditions.

3. In an excitation system for a generator having a field winding and disposed to supply energy to a plurality of load conductors, the combination comprising, a current transformer having a secondary winding and disposed to be responsive to the current flow through one of the load conductors, the field winding of the generator being connected to be responsive to the voltage across the secondary winding of the current transformer, and a shunt circuit connected in shunt circuit relationship with the field winding of the generator and also being connected to be responsive to the voltage across the secondary winding of the current transformer, the shunt circuit including two crystal diodes which are so interconnected as to offer a high impedance until a predetermined voltage is developed across the secondary winding of the current transformer and once the predetermined voltage is developed the impedance offered by the crystal diodes decreases so that if a large increase in current were to flow through the crystal diodes only a slight increase in voltage could appear across the secondary winding of the current transformer.

4. In an excitation system for a generator having a field winding and disposed to supply energy to a plurality of load conductors, the combination comprising, a current transformer having a secondary winding and disposed to be responsive to the current flow through one of the load conductors, the field winding of the generator being connected to be responsive to the voltage across the secondary winding of the current transformer, a saturating reactor having magnetic core means and a reactor winding disposed in inductive relationship with the magnetic core means, the reactor winding being connected in shunt circuit relationship with the field winding of the generator and being connected to also be responsive to the voltage across the secondary winding of the current transformer, so that the reactor winding offers a high impedance until a predetermined voltage across the secondary winding is reached, at which predetermined voltage the magnetic core means substantially completely saturates, to thereby prevent a further increase in the voltage across the secondary winding of the current transformer.

5. In an excitation system for a generator having a field winding and disposed to supply energy to a plurality of load conductors, the combination comprising, a current transformer having a secondary winding and disposed to be responsive to the current flow through one of the load conductors, a rectifier interconnected between the secondary winding of the current transformer and the field winding of the generator so that said field winding is responsive to the voltage across said secondary winding, and a series circuit including two crystal diodes connected back-to-back, the series circuit being connected in shunt circuit relationship with the said field winding, the crystal diodes being such as to offer a high impedance until a predetermined voltage is developed across the said secondary winding and once the predetermined voltage is developed the impedance offered by the crystal diodes decreases so that if a large increase in current were to flow through the crystal diodes only a slight increase in voltage would appear across the said secondary winding.

6. In an excitation system for a three-phase alternating-current generator having a field winding and disposed to supply energy to three load conductors, the combination comprising, a current transformer, having a secondary winding, associated with each of the three load conductors and disposed to be responsive to the current flow through the associated load conductor, a three-phase rectifier interconnected between the secondary windings of the current transformers and the field winding of said generator so that said field winding is responsive to the voltages across said secondary windings, and a series circuit associated with each of the secondary windings and connected to be responsive to the voltage across the respective secondary winding, each of the series circuits including two crystal diodes connected back-to-back and each of the series circuits being connected in shunt circuit relationship with the field winding of the said generator, the crystal diodes of each of the series circuits being such as to offer a high impedance until a predetermined voltage is developed across the respective secondary winding and once the predetermined voltage is developed the impedance offered by the series connected crystal diodes decreases so that if a large increase in current were to flow through said series connected crystal diodes only a slight increase in voltage could appear across the associated secondary winding.

7. In an excitation system for a three-phase alternating-current generator having a field winding and disposed to supply energy to three load conductors, the combination comprising, a current transformer, having a secondary winding, associated with each of the three load conductors and disposed to be responsive to the current flow through the associated load conductor, a three-phase rectifier interconnected between the secondary windings of the current transformers and the field winding of said generator so that said field winding is responsive to the voltages across said secondary windings, and a saturating reactor, having magnetic core means and a reactor winding disposed in inductive relationship with the magnetic core means, associated with each of the said secondary windings the reactor windings being connected in shunt circuit relationship with the said field winding and being responsive to the voltage across their respective secondary winding so that each of the reactor windings offers a high impedance until a predetermined voltage is reached across the respective secondary windings, at which predetermined voltage the respective magnetic core means substantially completely saturates, to thereby prevent a further increase in the voltage across the respective secondary windings.

8. In an excitation system for an alternating-current generator that is provided with a field winding and is disposed to be connected in parallel with another generator, the combination comprising, means for obtaining a measure of the output current of the alternating-current generator, the field winding of the alternating-current generator being responsive to the output of said means, a shunt circuit connected in shunt circuit relationship with the field winding of the alternating-current generator, the shunt circuit also being responsive to the output of the said means and including a voltage responsive impedance member whose impedance is a function of the magnitude of the voltage across the voltage responsive impedance member, to thus prevent excessive excitation of the alternating-current generator under short circuit conditions, a regulator system responsive to the output voltage of the alternating-current generator for controlling the voltage across the field winding of the alternating-current generator, a current transformer having a secondary winding and disposed to be responsive to the output current of the alternating-current generator, circuit means for so connecting the secondary winding of the current transformer to the regulator system as to provide droop compensation for the alternating-current generator, and another shunt circuit connected to said secondary winding, said another shunt circuit being of such characteristic as to offer a high impedance until a predetermined voltage is developed across the said secondary winding and once the predetermined voltage is developed the impedance of the said another shunt circuit decreases so that if a large increase in current were to flow through the said another shunt circuit only a slight increase in voltage would appear across the said secondary winding.

9. In an excitation system for an alternating-current generator that is provided with a field winding and is disposed to be connected in parallel with another generator, the combination comprising, means for obtaining a measure of the output current of the alternating-current generator, the field winding of the alternating-current generator being responsive to the output of said means, a shunt circuit connected in shunt circuit relationship with the field winding of the alternating-current generator, the shunt circuit also being responsive to the output of the said means and including a voltage responsive impedance member whose impedance is a function of the magnitude of the voltage across the voltage responsive impedance member, to thus prevent excessive excitation of the alternating-current generator under short circuit conditions, a regulator system responsive to the output voltage of the alternating-current generator for controlling the voltage across the field winding of the alternating-current generator, a current transformer having a secondary winding and disposed to be responsive to the output current of the alternating-current generator, circuit means for so connecting the secondary winding of the current transformer to the regulator system as to provide droop compensation for the alternating-current generator, and another shunt circuit, including two crystal diodes, connected to the secondary winding of the current transformer, the crystal diodes being so interconnected as to offer a high impedance until a predetermined voltage is developed across the secondary winding of the current transformer and once the predetermined voltage is developed the impedance offered by the crystal diodes decreases so that if a large increase in current were to flow through the crystal diodes only a slight increase in voltage would appear across the secondary winding of the current transformer, to thereby prevent excessive droop compensation of the alternating-current generator.

References Cited in the file of this patent
UNITED STATES PATENTS

| 1,943,524 | Godsey | Jan. 16, 1934 |
| 2,451,958 | Kilgore et al. | Oct. 19, 1948 |
| 2,555,539 | Graybrook | June 5, 1951 |